US012706767B2

(12) United States Patent
Karnas et al.

(10) Patent No.: US 12,706,767 B2
(45) Date of Patent: Aug. 11, 2026

(54) USING ARTIFICIAL INTELLIGENCE TO PROVIDE SEATING ARRANGEMENTS FOR A MEETING AREA FOR A VIRTUAL MEETING

(71) Applicant: Google LLC, Mountain View, CA (US)

(72) Inventors: Adam James Karnas, Del Mar, CA (US); Ryan Fedyk, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/818,357

(22) Filed: Aug. 28, 2024

(65) Prior Publication Data

US 2026/0067114 A1 Mar. 5, 2026

(51) Int. Cl.
*H04L 12/18* (2006.01)

(52) U.S. Cl.
CPC ................................ *H04L 12/1822* (2013.01)

(58) Field of Classification Search
None
See application file for complete search history.

(56) References Cited

U.S. PATENT DOCUMENTS 11,418,760 B1 8/2022 Lanier
2011/0149811 A1* 6/2011 Narayanaswamy .... H04L 67/02 370/261
2020/0322395 A1* 10/2020 Copley .................. H04N 7/157
2021/0010701 A1* 1/2021 Nesler ....................... F24F 3/14
2021/0051035 A1 2/2021 Atkins
2022/0329777 A1 10/2022 Lo
2022/0353305 A1* 11/2022 Han .................... H04L 65/1089
2023/0086906 A1* 3/2023 Tang ....................... G06T 11/00 715/753
2024/0163123 A1* 5/2024 Legatski ................ G06F 3/013

* cited by examiner

*Primary Examiner* — Raqiul A Choudhury
(74) *Attorney, Agent, or Firm* — Lowenstein Sandler LLP

(57) ABSTRACT

A method includes (1) obtaining first data associated with a first meeting area for a virtual meeting; (2) identifying, using a first AI model and using the first data as input, location values for locations in the first meeting areas, the location values indicating whether a respective location is to be used for seating during the virtual meeting; (3) causing a virtual meeting UI to be presented on a user device of a first in-person participant of the one or more in-person participants, the UI including a region corresponding to the first meeting area and visual indications indicating the location values corresponding to respective locations in the first meeting area.

20 Claims, 7 Drawing Sheets

USING ARTIFICIAL INTELLIGENCE TO PROVIDE SEATING ARRANGEMENTS FOR A MEETING AREA FOR A VIRTUAL MEETING

TECHNICAL FIELD

Aspects and implementations of the present disclosure relate to virtual meetings and more specifically to using artificial intelligence to provide seating arrangements for a meeting area for a virtual meeting.

BACKGROUND

Virtual meetings can take place between multiple participants via a virtual meeting platform. A virtual meeting platform can include tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the virtual meeting platform can provide a user interface that includes multiple regions to present the video stream of each participating client device.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a method. The method includes obtaining first data associated with a first meeting area for a virtual meeting that has one or more in-person participants and one or more virtual participants. The method includes identifying, using a first artificial intelligence (AI) model and using the first data as input: one or more locations within the first meeting area for the one or more in-person participants, and, for each location of the one or more locations for the one or more in-person participants, a location value corresponding to the respective location. The method includes causing a virtual meeting user interface (UI) to be presented on a user device of a first in-person participant of the one or more in-person participants. The virtual meeting UI may include a first region corresponding to the first meeting area. The first region may include, for each location of the one or more locations for the one or more in-person participants, a visual indication indicating the location value corresponding to the respective location. The location value can indicate whether the respective location is to be used for seating during the virtual meeting.

Another aspect of the disclosure provides a system. The system includes a memory and a processing device coupled to the memory. The processing device is configured to perform one or more operations. The operations include obtaining first data associated with a first meeting area for a virtual meeting that has one or more in-person participants and one or more virtual participants. The operations include identifying, using a first AI model and using the first data as input: one or more locations within the first meeting area for the one or more in-person participants, and, for each location of the one or more locations for the one or more in-person participants, a location value corresponding to the respective location. The operations include causing a virtual meeting UI to be presented on a user device of a first in-person participant of the one or more in-person participants. The virtual meeting UI may include a first region corresponding to the first meeting area. The first region may include, for each location of the one or more locations for the one or more in-person participants, a visual indication indicating the location value corresponding to the respective location. The location value can indicate whether the respective location is to be used for seating during the virtual meeting.

Another aspect of the disclosure provides a non-transitory computer-readable storage medium with instructions that, when executed by a processing device, cause the processing device to perform one or more operations. The operations include obtaining first data associated with a first meeting area for a virtual meeting that has one or more in-person participants and one or more virtual participants. The operations include identifying, using a first AI model and using the first data as input: one or more locations within the first meeting area for the one or more in-person participants, and, for each location of the one or more locations for the one or more in-person participants, a location value corresponding to the respective location. The operations include causing a virtual meeting UI to be presented on a user device of a first in-person participant of the one or more in-person participants. The virtual meeting UI may include a first region corresponding to the first meeting area. The first region may include, for each location of the one or more locations for the one or more in-person participants, a visual indication indicating the location value corresponding to the respective location. The location value can indicate whether the respective location is to be used for seating during the virtual meeting.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
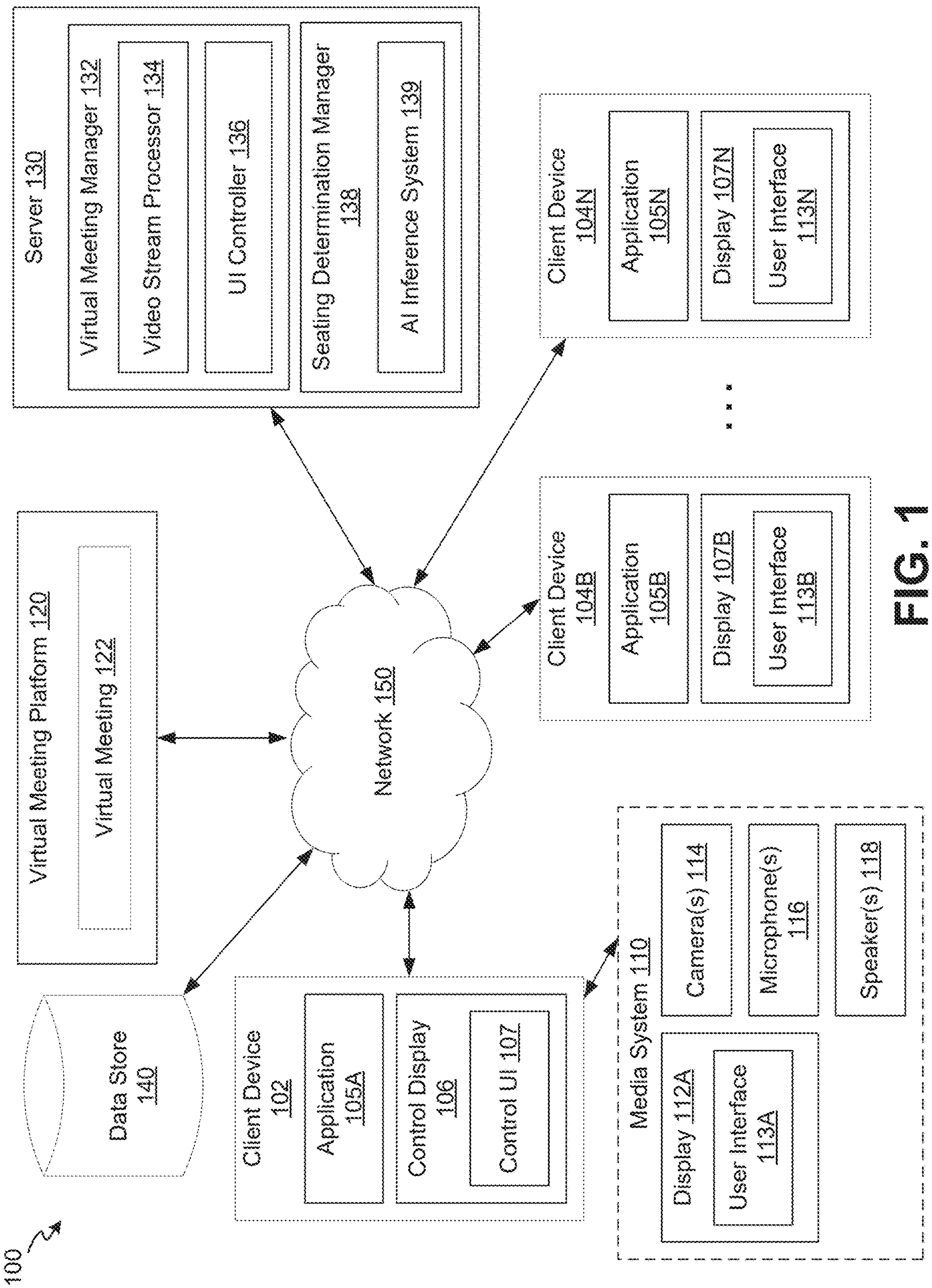
FIG. 1 illustrates an example system architecture for using artificial intelligence (AI) to provide seating arrangements for a meeting area for a virtual meeting, in accordance with some implementations of the present disclosure.

Aspects of the present disclosure relate to using artificial intelligence (AI) to provide seating arrangements for a meeting area for a virtual meeting. A virtual meeting platform can enable video-based conferences between multiple participants via respective client devices that are connected over a network and share each other's audio (e.g., voice of a user recorded via a microphone of a client device) and/or video streams (e.g., a video captured by a camera of a client device) during a virtual meeting. In some instances, a virtual meeting platform can enable a significant number of client devices (e.g., up to one hundred or more client devices) to be connected via the virtual meeting. A participant of a virtual meeting can speak to the other participants of the virtual meeting. Some existing virtual meeting platforms can provide a user interface (UI) to each client device connected to the virtual meeting, where the UI displays visual items corresponding to the video streams shared over the network in a set of regions in the UI.

In some virtual meetings, one or more participants may be located in a meeting area. A meeting area may include a physical location configured to accommodate multiple virtual meeting participants using a single client device to interact with other virtual meeting participants. One example of a meeting area is a conference room. The meeting area may include one or more displays, cameras, microphones, speakers or other equipment connected to a client device to provide audio or video data to a virtual meeting. The participants located in the meeting area can be referred to in the present disclosure as "in-person participants."

The meeting area may include locations within the meeting area where in-person participants can sit, stand, or otherwise occupy the meeting area while participating in the virtual meeting. However, the camera(s) and microphone(s) of the meeting area may capture some locations within the meeting area better than other locations. For example, a camera may not capture (or may poorly capture) video of a participant located far away from the camera, in a place where lighting conditions are poor, or located in a place where the camera view is obstructed. Similarly, a microphone may not capture (or may poorly capture) audio of a participant located far away from the microphone. It may not be apparent to in-person participants which locations in the meeting area allow for the camera(s) or microphone(s) to capture quality video and audio of the participants.

Implementations of the present disclosure address the above and other deficiencies by using AI to determine which locations in a meeting area allow cameras and microphones to capture quality video and audio of in-person virtual meeting participants. An AI model can be trained on image and audio data of meeting areas to learn how to recognize meeting area locations that allow cameras and microphones to capture quality video and audio of in-person participants. The AI model can then obtain first data associated with a meeting area (e.g., images of the meeting area, audio data captured in the meeting area, etc.). The AI model can identify, using the first data as input, one or more locations within the meeting area and, for each location, a location value that can indicate whether the respective location should be used for seating during a virtual meeting. A user device present in the meeting area can then display, on the device's virtual meeting user interface (UI), an image of the meeting area with visual indications for each location indicating whether the location should be used for seating during a virtual meeting. An in-person participant can then enter the meeting area, view the virtual meeting UI to find a seating location, and then go and sit in that location. An AI model can also detect when the in-person participant has moved away from the seating location (e.g., because the participant has shifted their chair) and can cause the virtual meeting UI to display an alert so the participant can move back to that seating location.

Aspects of the present disclosure provide technical advantages over previous virtual meeting solutions. Aspects of the present disclosure provide an AI model that automatically identifies suitable seating locations for in-person virtual meeting participants so that cameras and microphones in a meeting area can capture high-quality video and audio of in-person participants. The video and audio captured of the in-person participants are of higher quality than that of conventional virtual meeting software. The higher quality video and audio data improves the virtual meeting experience of the participants of the virtual meeting.

Aspects of the present disclosure provide technical solutions to technical problems associated with virtual meetings. One technical problem includes the poor quality of video and audio generated by cameras and microphones located in a meeting area. A technical solution to the technical problem includes using an AI model to determine seating locations for in-person virtual meeting participants located in the meeting area so the cameras and microphones can capture higher-quality video and audio of the in-person participants. As a result, low-quality video and audio data provided to the virtual meeting is reduced or eliminated.

FIG. 1 illustrates an example system architecture 100, in accordance with implementations of the present disclosure. The system architecture 100 includes one or more client devices 102, 104B-N, a virtual meeting platform 120, a server 130, and a data store 140, each connected to a network 150.

In some implementations, the virtual meeting platform 120 enables users of one or more of the client devices 102, 104B-N to connect with each other in a virtual meeting (e.g., a virtual meeting 122). A virtual meeting 122 refers to a real-time communication session such as a video-based call or video chat, in which participants can connect with multiple additional participants in real-time and be provided with audio and video capabilities. A virtual meeting 122 may include an audio-based call or chat, in which participants connect with multiple additional participants in real-time and are provided with audio capabilities. Real-time communication refers to the ability for users to communicate (e.g., exchange information) instantly without transmission delays and/or with negligible (e.g., milliseconds or microseconds) latency. The virtual meeting platform 120 can allow a user of the virtual meeting platform 120 to join and participate in a virtual meeting 122 with other users of the virtual meeting platform 120 (such users sometimes being referred to, herein, as "virtual meeting participants" or, simply, "participants"). Implementations of the present disclosure can be implemented with any number of participants connecting via the virtual meeting 122 (e.g., up to one hundred or more).

In implementations of the disclosure, a "user" or "participant" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether the virtual meeting platform 120 or the virtual meeting manager 132 collects user information (e.g., information about a user's social network, social actions or activities, profession, a user's preferences, or a user's current location), or to control whether or how to receive content from the virtual meeting platform 120 or the virtual meeting manager 132 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the virtual meeting platform 120 or the virtual meeting manager 132.

In some implementations, the server 130 includes a virtual meeting manager 132. The virtual meeting manager 132, in one or more implementations, is configured to manage a virtual meeting 122 between multiple users of the virtual meeting platform 120. The virtual meeting manager 132 can provide UIs 113A-N to each client device 102, 104B-N to enable users to watch and listen to each other during a virtual meeting 122. The virtual meeting manager 132 can also collect and provide data associated with the virtual meeting 122 to each participant of the virtual meeting 122. In some implementations, the virtual meeting manager 132 provides the UIs 113A-N for presentation by client applications 105A-N. For example, the respective UIs 113A-N can be displayed on the display devices 107A-N by the client applications 105A-N executing on the operating systems of the client devices 102, 104B-N. In some implementations, the virtual meeting manager 132 determines visual items for presentation in the UIs 113A-N during a virtual meeting. A visual item can refer to a UI element that occupies a particular region in the UI and is dedicated to presenting a video stream from a respective client device. Such a video stream can depict, for example, a user of the respective client device 102, 104B-N while the user is participating in the virtual meeting 122 (e.g., speaking, presenting, listening to other participants, watching other participants, etc., at particular moments during the virtual meeting 122), a physical conference or meeting room (e.g., with one or more participants present), a document or media content (e.g., video content, one or more images, etc.) being presented during the virtual meeting 122, etc.

In some implementations, the virtual meeting manager 132 includes a video stream processor 134 and a UI controller 136. Each of the video stream processor 134 or the UI controller 136 may include a software application (or a subset thereof) that performs certain virtual meeting functionality for the virtual meeting manager 132. The video stream processor 134 may be configured to receive video streams from one or more of the client devices 102, 104B-N. The video stream processor 134 may be configured to determine visual items for presentation in the UI of such client devices 102, 104B-N (e.g., the UIs 113A-N) during the virtual meeting 122. Each visual item can correspond to a video stream from a client device 102, 104B-N (e.g., the video stream pertaining to one or more participants of the virtual meeting 122). In some implementations, the video stream processor 134 receives audio streams associated with the video streams from the client devices (e.g., from an audiovisual component of the client devices 102, 104B-N). Once the video stream processor 134 has determined visual items for presentation in the UI, the video stream processor 134 can notify the UI controller 136 of the determined visual items. The visual items for presentation can be determined based on current speaker, current presenter, order of the participants joining the virtual meeting 122, list of participants (e.g., alphabetical), etc.

In some implementations, the UI controller 136 provides the UI for the virtual meeting 122 (e.g., the UI 113A-N). The UI can include multiple regions. Each region can display a video stream pertaining to one or more participants of the virtual meeting 122. The UI controller 136 can control which video stream is to be displayed by providing a command to one or more client devices 102, 104B-N that indicates which video stream is to be displayed in which region of the UI (along with the received video and audio streams being provided to the client devices 102, 104B-N). For example, in response to being notified of the determined visual items for presentation in the UI 113A-N, the UI controller 136 can transmit a command causing each determined visual item to be displayed in a region of the UI and/or rearranged in the UI.

In one or more implementations, the virtual meeting manager 132 includes a seating determination manager 138. The seating determination manager 138 may include a software application (or a subset thereof) that performs certain virtual meeting functionality for the virtual meeting manager 132. The seating determination manager 138 may be configured to identify one or more locations within a meeting area and, for each location, determine a location value corresponding to the respective location. The location value can indicate whether the associated location is a suitable seating location for an in-person participant. The seating determination manager 138 can provide the location values to a virtual meeting UI for display in the meeting area so in-person participants can view the virtual meeting UI and select a suitable seating location. The seating determination manager 138 may include an AI inference system 139. The AI inference system 139 may include one or more AI models configured to identify the meeting area locations and determine the location values. Functionality of the seating determination manager 138 is discussed further below in relation to FIG. 4.

In some implementations, each of the virtual meeting platform 120 or the server 130 include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a virtual meeting 122. The virtual meeting platform 120 can also include a website (e.g., one or more webpages) or application back-end software that can be used to enable a user to connect with other users by way of the virtual meeting 122.

In some implementations, the system architecture 100 includes a client device 102. The client device 102 may be associated with a physical meeting area (e.g., a conference room). The client device 102 may include a computing device used by in-person participants of the virtual meeting 122 to participate in the virtual meeting 122. In-person participants can use the client device 102 rather than their own devices (e.g., one or more of the client devices 104B-N) to participate in the virtual meeting 122. In some implementations, the client device 102 includes an application 105A.

The application 105A may include a mobile application, a desktop application, a web browser, etc. executing on the client device 102 that performs virtual meeting functionality. The client device 102 may include a control display 106, which may include a display device used to present a UI to the in-person participants of the virtual meeting 122. The UI may include a control UI 107, which may include a UI that the in-person participants can use to interact with the application 105A and/or control the media system 110.

The control UI 107 may include a UI that in-person participants can use to control the media system 110 and its components, perform virtual meeting functions and operations, or perform other functionality related to the virtual meeting 122. For example, an in-person participant can use the application 105A to join and participate in the virtual meeting 122 via the control UI 107, mute or unmute the video or audio of the media system 110, cause the virtual meeting 122 to present a document to participants of the virtual meeting 122, or other virtual meeting functionality. The control UI 107 may display an image of the meeting area overlayed with visual indications indicating whether a certain location in the meeting area is suitable for an in-person participant to sit or otherwise be present, as discussed herein.

The client device 102 can include or be coupled to a media system 110. The media system 110 may include one or more devices that allow in-person participants to interact with the virtual meeting 122. The media system 110 may include one or more displays 112A, one or more cameras 114, one or more microphones 116, or one or more speakers 118. A display 112A can be, for example, a smart display or a non-smart display (e.g., a display that is not itself configured to connect to the network 150). The display 112A can present a UI 113A, which may include multiple regions to present visual items corresponding to video streams of the client devices 102, 104B-N provided to the server 130 for the virtual meeting 122. The one or more cameras 114 can be used to capture a video stream of the meeting area associated with the client device 102. The one or more microphones 116 can capture one or more audio streams of the meeting area. The one or more speakers 118 can play audio received from the virtual meeting 122.

In some implementations, the one or more client devices 104B-N each include one or more computing devices such as personal computers (PCs), laptops, mobile phones, smart phones, tablet computers, netbook computers, network-connected televisions, etc. Each client device 104B-N may include one or more components that may be similar to the components of the client device 102, for example, the application 105B-N, a display 107B-N, or the UI 113B-N. A client device 104B-N may include an audiovisual component that can generate audio and video data to be streamed to the virtual meeting manager 132. The audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 104B-N. In some implementations, the audiovisual component includes an image capture device (e.g., a camera) to capture images and generate video data (e.g., a video stream) of the captured data of the captured images.

As described previously, an audiovisual component of each client device 102, 104B-N can capture images and generate video data (e.g., a video stream) of the captured data of the captured images. In some implementations, the client devices 102, 104B-N transmit the generated video stream to virtual meeting manager 132. The audiovisual component of each client device 102, 104B-N can also capture an audio signal representing speech of a user and generate audio data (e.g., an audio file or audio stream) based on the captured audio signal. In some implementations, the client devices 102, 104B-N transmit the generated audio data to the virtual meeting manager 132.

In one or more implementations, the seating determination manager 138 is part of a client device 102, 104B-N. For example, the application 105A-N can include the seating determination manager 138, which can perform the seating location-identifying functionality discussed herein. In some implementations, the application 105A sends the video stream to the other client devices 102, 104 B-N, and receives the video streams from the other client devices 102, 104 B-N, and the applications 105A-N can generate their respective virtual meeting UIs 113A-N or can finalize their respective UIs 113A-N, which may have been partially generated by the UI controller 136.

In some implementations, the data store 140 is a persistent storage that is capable of storing data as well as data structures to tag, organize, and index the data. A data item can include audio data and/or video stream data, in accordance with implementations described herein. The data store 140 can be hosted by one or more storage devices, such as main memory, magnetic or optical storage-based disks, tapes, hard drives, flash memory, and so forth. In some implementations, the data store 140 is a network-attached file server, while in other implementations, the data store 140 is some other type of persistent storage such as an object-oriented database, a relational database, and so forth, that can be hosted by the virtual meeting platform 120 or one or more different machines (e.g., the server 130) coupled to the virtual meeting platform 120 using the network 150. In some implementations, the data store 140 stores portions of audio and video streams received from one or more client devices 102, 104B-N for the virtual meeting platform 120. Moreover, the data store 140 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102, 104B-N and/or concurrently editable by the users.

In some implementations, the network 150 includes a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

It should be noted that in some implementations, the functions of the virtual meeting platform 120 or the server 130 are provided by a fewer number of machines. For example, in some implementations, the server 130 is integrated into a single machine, while in other implementations, the server 130 is integrated into multiple machines. In addition, in one or more implementations, the server 130 is integrated into the virtual meeting platform 120.

In general, one or more functions described in the several implementations as being performed by the virtual meeting platform 120 or server 130 can also be performed by the client devices 102, 104B-N in other implementations, if appropriate. In addition, in some implementations, the functionality attributed to a particular component can be performed by different or multiple components operating together. The virtual meeting platform 120 or the server 130 can also be accessed as a service provided to other systems or devices through appropriate application programming interfaces, and thus is not limited to use in websites.

Although implementations of the disclosure are discussed in terms of the virtual meeting platform 120 and users of the virtual meeting platform 120 participating in a virtual meeting 122, implementations can also be generally applied to any type of telephone call, conference call, or other technological communications methods between users. Implementations of the disclosure are not limited to virtual meeting platforms that provide virtual meeting tools to users.

Figure 2:
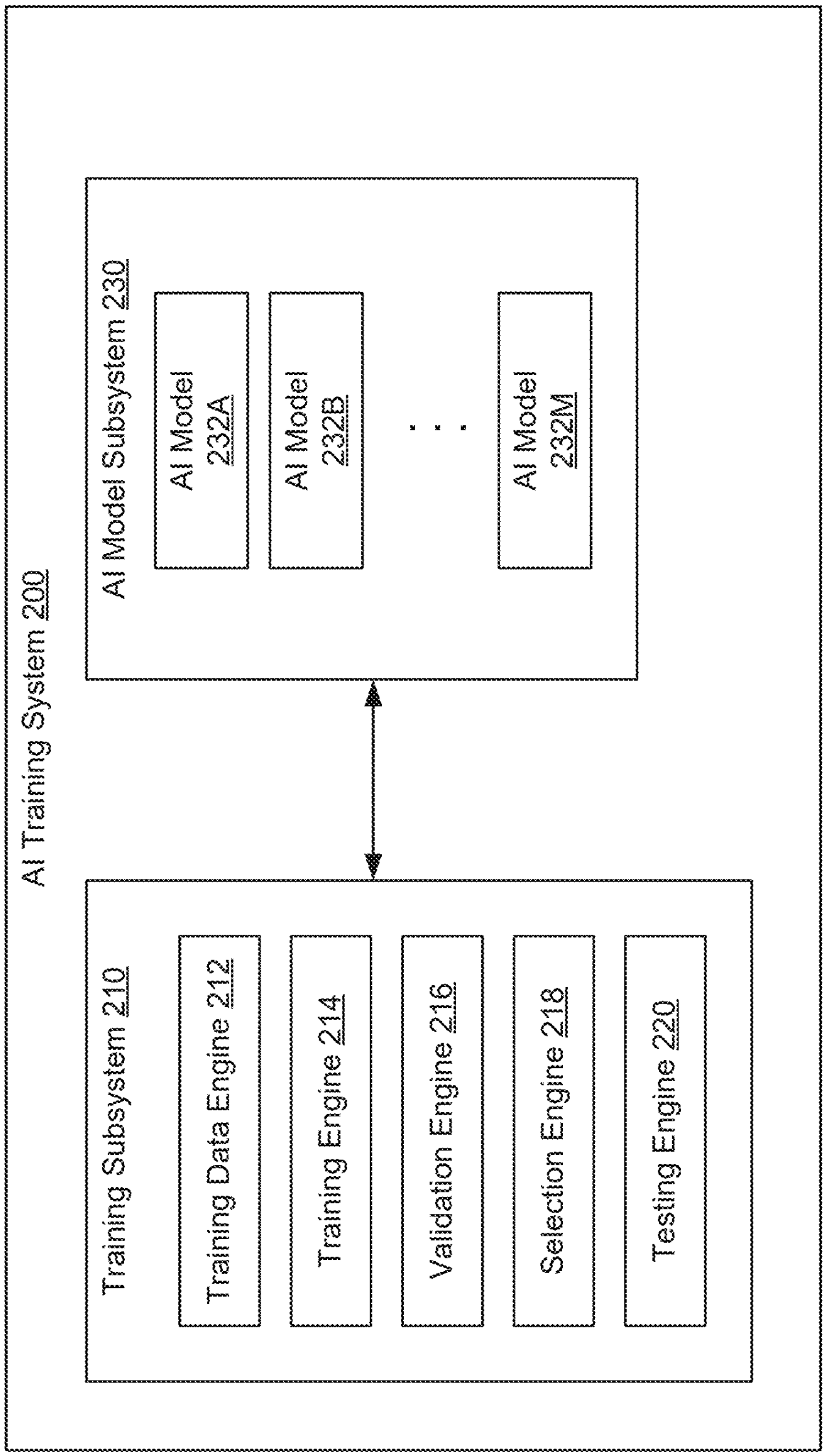
FIG. 2 illustrates a schematic block diagram for an AI training subsystem of a virtual meeting platform, in accordance with some implementations of the present disclosure.

FIG. 2 illustrates an example AI training system 200, in accordance with implementations of the present disclosure. As illustrated in FIG. 2, the AI training system 200 may include a training subsystem 210, which may include a training data engine 212, a training engine 214, a validation engine 216, a selection engine 218, or a testing engine 220. The AI training system 200 may include an AI model subsystem 230. The AI model subsystem 230 may include one or more AI models 232A-M.

In one implementation, the AI model 232A-M includes one or more of artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron can be connected to one or more neurons via one or more edges ("synapses"). The synapses can perpetuate a signal from one neuron to another, and a weight, bias, or other configuration of a neuron or synapse can adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that can be used is a long short term memory (LSTM) neural network.

ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one implementation, an AI model 232A-M includes a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), or a large language model (LLM). In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some implementations, an AI model 232A-M is an AI model that has been trained on a corpus of data. In some implementations, the AI model 232A-M can be a model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model 232A-M to learn broad elements including, image or speech recognition, general sentence structure, common phrases, vocabulary, natural language structure, and other elements. In some implementations, this first, foundational model is trained using self-supervision, or unsupervised training on such datasets.

In some implementations, the AI model 232A-M is then further trained or fine-tuned on organizational data, including proprietary organizational data. The AI model 232A-M can also be further trained or fine-tuned on organizational data associated with recognizing meeting area locations that allow cameras and microphones to capture quality video and audio of in-person participants of a virtual meeting 122.

In some implementations, the second portion of training, including fine-tuning, may be unsupervised, supervised, reinforced, or any other type of training. In some implementations, this second portion of training includes some elements of supervision, including learning techniques incorporating human or machine-generated feedback, undergoing training according to a set of guidelines, or training on a previously labeled set of data, etc. In a non-limiting example associated with reinforcement learning, the outputs of the AI model 232A-M while training can be ranked by a user, according to a variety of factors, including accuracy, helpfulness, veracity, acceptability, or any other metric useful in the fine-tuning portion of training. In this manner, the AI model 232A-M can learn to favor these and any other factors relevant to users when generating a response. Further details regarding training are provided below.

In some implementations, an AI model 232A-M includes one or more pre-trained models, or fine-tuned models. In a non-limiting example, in some implementations, the goal of the "fine-tuning" is accomplished with a second, or third, or any number of additional models. For example, the outputs of the pre-trained model can be input into a second AI model 232A-M that has been trained in a similar manner as the "fine-tuned" portion of training above. In such a way, two more AI models 232A-M can accomplish work similar to one model that has been pre-trained, and then fine-tuned.

As indicated above, an AI model 232A-M may be one or more generative AI models 232A-M, allowing for the generation of new and original content. The generative AI model 232A-M can use other machine learning models including an encoder-decoder architecture including one or more self-attention mechanisms, and one or more feed-forward mechanisms. In some implementations, the generative AI model 232A-M includes an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model 232A-M can also utilize the previously discussed deep learning techniques, including RNNs, CNNs, or transformer networks. Further details regarding generative AI models 232A-M are provided herein.

In some implementations, different AI models 232A-M of the one or more AI models 232A-M are different types of AI models 232A-M. Multiple AI models 232A-M of the one or more AI models 232A-M can form an ensemble.

In one implementation, the training subsystem 210 manages the training and testing of the one or more AI models 232A-M. The training data engine 212 can generate training data (e.g., a set of training inputs and a set of target outputs) to train an AI model 232A-M. In an illustrative example, the training data engine 212 can initialize a training set T to null. The training data engine 212 may obtain training data. The training data may include, as training inputs, images of meeting areas. The training data may include, as training outputs, location values for different locations in the meeting areas.

The training data engine 212 can add the training data to the training set T and can determine whether training set T is sufficient for training the AI model 232A-M. The training set T can be sufficient for training the AI model 232A-M if the training set T includes a threshold amount of training data, in some implementations. In response to determining that the training set T is not sufficient for training, the training data engine 212 can obtain additional training data. In response to determining that the training set T is sufficient for training, the training data engine 212 can provide the training set T to the training engine 214.

The training engine 214 can train the AI model 232A-M using the training data (e.g., training set T). The AI model 232A-M can refer to the model artifact that is created by the training engine 214 using the training data, where such training data can include training inputs and, in some implementations, corresponding target outputs (e.g., correct answers for respective training inputs). The training engine 214 can input the training data into the AI model 232A-M so that the AI model 232A-M can find patterns in the training data and configure itself based on those patterns.

Where the AI model 232A-M uses supervised learning, the training engine 214 can assist the AI model 232A-M in determining whether the AI model 232A-M maps the training input to the target output (the answer to be predicted). Where the AI model 232A-M uses unsupervised learning, the training engine 214 can input the training data into the AI model 232A-M. The AI model 232A-M can configure itself based on the input training data, but since the training data may not include a target output, the training engine 214 may not assist the AI model 232A-M in determining whether the AI model 232A-M provided a correct output during the training process.

The validation engine 216 may be capable of validating a trained AI model 232A-M using a corresponding set of features of a validation set from the training data engine 212. The validation engine 216 can determine an accuracy of each of the trained AI models 232A-M based on the corresponding sets of features of the validation set. Where the training data may not include a target output, validating a trained AI model 232A-M may include obtaining an output from the AI model 232A-M and providing the output to another entity for evaluation. The other entity may include another AI model configured to evaluation the output of the AI model that is undergoing training. The other entity may include a human. The validation engine 216 can discard a trained AI model 232A-M that has an accuracy that does not meet a threshold accuracy or that otherwise fails evaluation. In some implementations, the selection engine 218 is capable of selecting a trained AI model 232A-M that has an accuracy that meets a threshold accuracy. In some implementations, the selection engine 218 is capable of selecting the trained AI model 232A-M that has the highest accuracy of multiple trained AI models 232A-M. In some implementations, the selection engine 218 obtains input from another AI model or a human and can select a trained AI model 232A-M based on the input.

The testing engine 220 may be capable of testing a trained AI model 232A-M using a corresponding set of features of a testing set from the training data engine 212. For example, a first trained AI model 232A-M that was trained using a first set of features of the training set may be tested using the first set of features of the testing set. The testing engine 220 can determine a trained AI model 232A-M that has the highest accuracy or other evaluation of all of the trained AI models 232A-M based on the testing sets.

As described above, the AI training system 200 can be configured to train an LLM. It should be noted that the AI training system 200 can train an LLM in accordance with implementations described herein or in accordance with other techniques for training LLMs. For example, an LLM may be trained on a large amount of data, including prediction of one or more missing words in a sentence, identification of whether two consecutive sentences are logically related to each other, generation of next texts based on prompts, etc.

In some implementations, the AI model subsystem 230 selects an AI model 232A-M from the one or more AI models 232A-M. Selecting an AI model 232A-M may include selecting the AI model 232A-M for training or for use. For example, the training subsystem 210 can provide data to the AI model subsystem 230 indicating which AI model 232A-M is to be trained. The AI model subsystem 230 can obtain data from a component of the architecture 100 indicating which AI model 232A-M to use to generate output for the seating determination manager 138.

Figure 3:
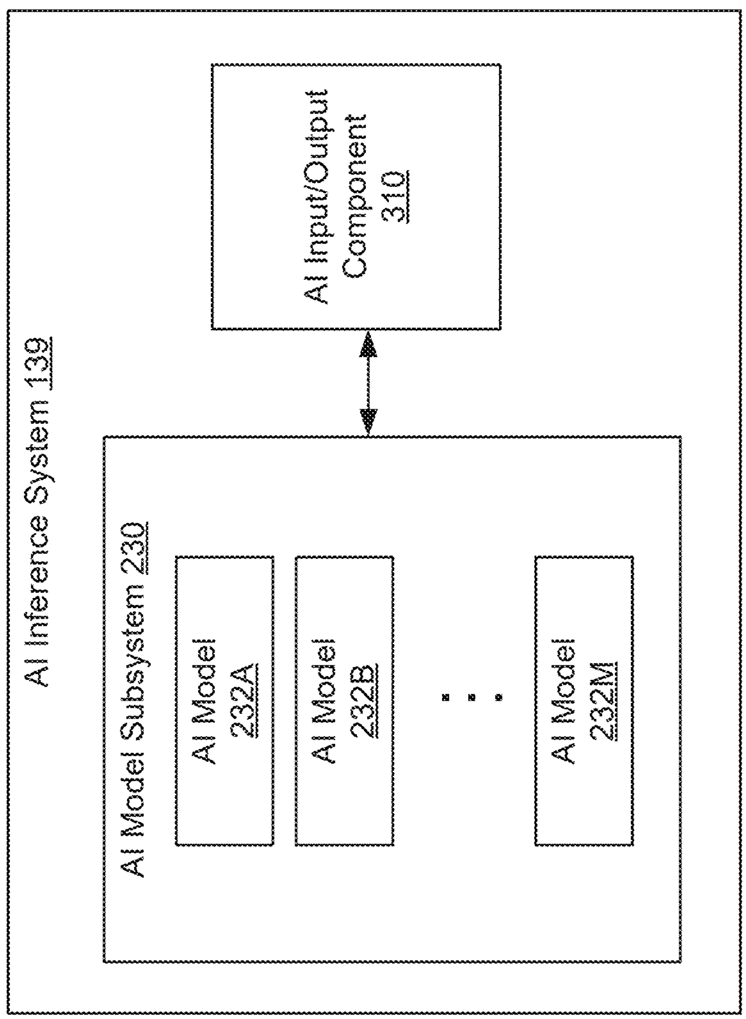
FIG. 3 illustrates a schematic block diagram for an AI inference subsystem of a virtual meeting platform, in accordance with some implementations of the present disclosure.

FIG. 3 depicts one implementation of an AI inference system 139. The AI inference system 139 may include the AI model subsystem 230, which may include one or more AI models 232A-M. The AI inference system 139 may include an AI input/output component 310. The AI input/output component 310 may be configured to feed data as input to an AI model 232A-M and obtain one or more outputs. In such implementations, the AI input/output component 310 feeds one or more images of a meeting area as input to an AI model 232A-M and obtains one or more outputs.

In some implementations, the AI inference system 139 is not part the seating determination manager 138 and may, instead, be part of another system or sub-system or be an independent system. In some implementations, the AI inference system 139 includes the AI training system 200.

As indicated above, in some implementations, the AI model 232A-M includes an LLM. In some implementations, the LLM includes generative AI functionality. In such implementations, the AI model 232A-M generates new content based on provided input data (e.g., one or more images of a meeting area). The generative AI model 232A-M can be supported by a prompt subsystem (not shown), which may reside on the virtual meeting platform 120, the server 130, or some other component of the architecture 100. The prompt subsystem can enable a user or a component of the architecture 100 to access the generative AI model 232A-M. The prompt subsystem may be configured to perform automated identification of, and facilitate retrieval of, relevant and timely contextual information for efficient and accurate processing of prompts by the AI model 232A-M. Using the network 150 (or another network), the prompt subsystem may be in communication with one or more of the client devices 102, 104B-N, the virtual meeting platform 120, the server 130, the virtual meeting manager 132, or the seating determination manager 138. Communications between the prompt subsystem and the AI input/output component 310 may be facilitated by a generative model application programming interface (API), in some implementations. Communications between the prompt subsystem and the client devices 102, 104B-N, the virtual meeting platform 120, the server 130, the virtual meeting manager 132, or the seating determination manager 138 may be facilitated by a data management API. In additional or alternative implementations, the generative model API translates prompts generated by the prompt subsystem into unstructured natural-language format and, conversely, translate responses received from the AI model 232A-M into any suitable form (e.g., including any structured proprietary format as may be used by the prompt subsystem). Similarly, the data management API can support instructions that may be used to communicate data requests to the client devices 102, 104B-N, the virtual meeting platform 120, the server 130, the virtual meeting manager 132, or the seating determination manager 138 and formats of data received from such components.

As indicated above, a user can interact with the prompt subsystem via a prompt interface. The prompt interface may include a UI element that can support any suitable types of user inputs (e.g., textual inputs, speech inputs, image inputs, etc.). The UI element can further support any suitable types of outputs (e.g., textual outputs, speech outputs, image outputs, etc.). In some implementations, the UI element is a web-based UI element, a mobile application-supported UI element, or any combination thereof. The UI element include may include selectable items, in some implementations, that enable a user to select from multiple generative AI models 232A-M. The UI element can allow the user to provide consent for the prompt subsystem or the generative AI model 232A-M to access user data or other data associated with a client device 102, 104B-N stored in the data store 140, process, or store new data received from the user, and the like. The UI element can additionally or alternatively allow the user to withhold consent to provide access to user data. In some implementations, user input entered using the UI element is communicated to the prompt subsystem by a user API. The user API can be located at the client device 102, 104B-N of the user accessing the query tool.

In some implementations, the prompt subsystem includes a prompt analyzer to support various operations of this disclosure. For example, the prompt analyzer can receive an input (e.g., a prompt submitted by a user of or component of the architecture 100) and generate one or more intermediate prompts to the generative AI model 232A-M to determine what type of data the generative AI model 232A-M may need to successfully respond to the input. Upon receiving a response from the generative AI model 232A-M, the prompt analyzer can analyze the response, form a request for relevant contextual data for the data store 140, which can then supply such data. The prompt analyzer can then generate a prompt to the generative AI model 232A-M that includes the original prompt and the contextual data. In some implementations, the prompt analyzer, itself, includes a lightweight generative AI model that can process the intermediate prompt(s) and determine what type of contextual data may be needed by the generative AI model 232A-M together with the original prompt to ensure a meaningful response from generative AI model 232A-M.

The prompt subsystem may include (or may have access to) instructions stored on one or more tangible, machine-readable storage media of a computing device (e.g., one or more of the client devices 102, 104B-N, the virtual meeting platform 120, the server 130, or some other device) and executable by one or more processing devices of the computing device. In one implementation, the prompt subsystem is implemented on a single machine. In some implementations, the prompt subsystem is combination of a client component and a server component. In some implementations, the prompt subsystem is executed entirely on a client device 102, 104B-N. Alternatively, some portion of the prompt subsystem may be executed on a client computing device while another portion of the query tool may be executed on a server machine.

Figure 4:
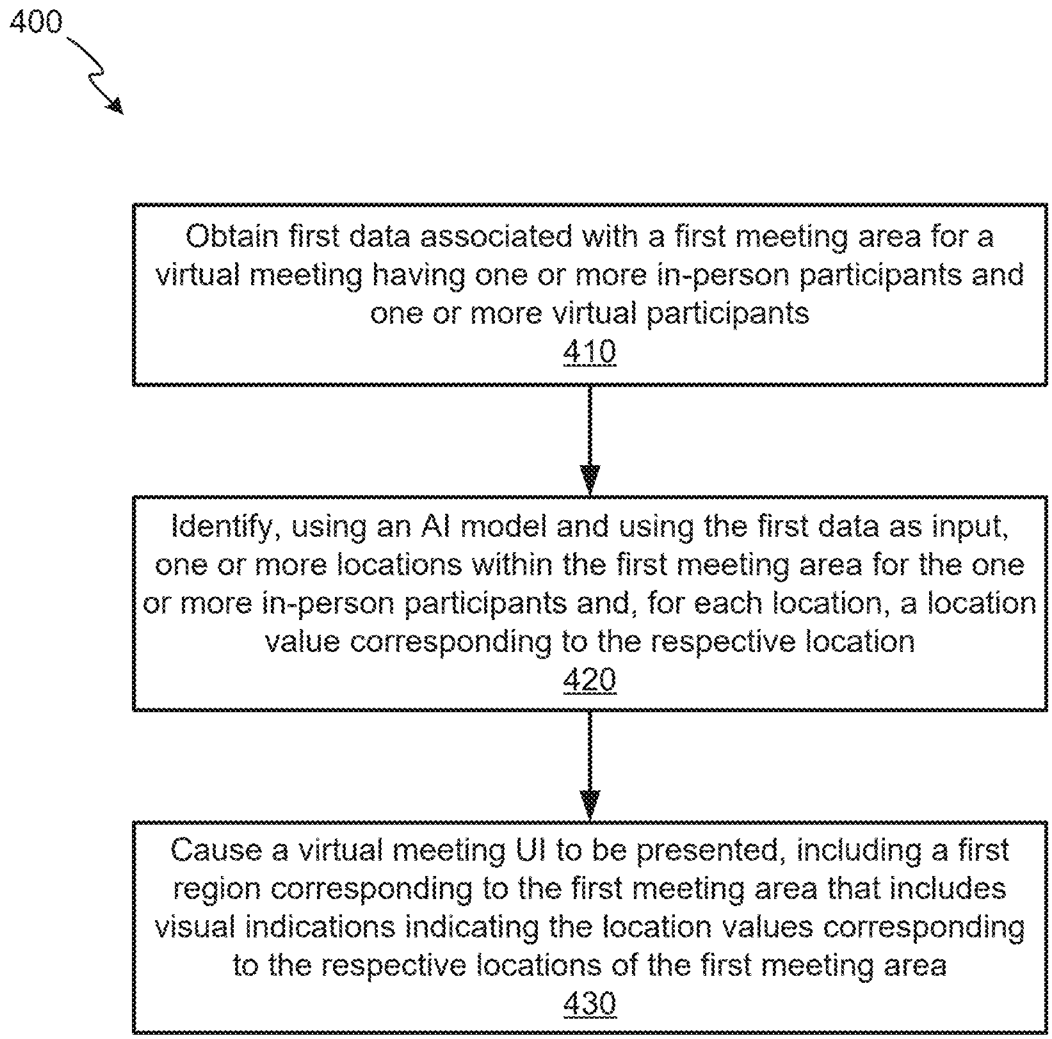
FIG. 4 depicts a flow diagram of a method for using AI to provide seating arrangements for a meeting area for a virtual meeting, in accordance with some implementations of the present disclosure.

FIG. 4 is a flowchart illustrating one embodiment of a method 400 for using AI to provide seating arrangements for a meeting area for a virtual meeting 122, in accordance with some implementations of the present disclosure. A processing device, having one or more central processing units (CPU(s)), one or more graphics processing units (GPU(s)), and/or memory devices communicatively coupled to the one or more CPU(s) and/or GPU(s) can perform the method 400 and/or one or more of the method's 400 individual functions, routines, subroutines, or operations. In certain implementations, a single processing thread can perform the method 400. Alternatively, two or more processing threads can perform the method 400, each thread executing one or more individual functions, routines, subroutines, or operations of the method. In an illustrative example, the processing threads implementing the method 400 can be synchronized (e.g., using semaphores, critical sections, and/or other thread synchronization mechanisms). Alternatively, the processing threads implementing the method 400 can be executed asynchronously with respect to each other. Various operations of the method 400 can be performed in a different (e.g., reversed) order compared with the order shown in FIG. 2. Some operations of the method 400 can be performed concurrently with other operations. Some operations can be optional. In some implementations, the seating determination manager 138 performs one or more of the operations of the method 400.

At block 410, processing logic obtains first data associated with a first meeting area for a virtual meeting 122. The virtual meeting 122 can have one or more in-person participants and one or more virtual participants. As discussed above, an "in-person participant" can refer to a participant of the virtual meeting 122 that is located in a meeting area, and a "virtual participant" can refer to a participant of the virtual meeting that is not located in a meeting area. Also as discussed above, a "meeting area" can refer to a physical location configured to accommodate multiple virtual meeting 122 participants using a client device 102 to interact with other virtual meeting 122 participants.

In one implementation, the first data includes one or more images of the first meeting area. An image of the first meeting area may include an image of the first meeting area before the beginning of the virtual meeting 122. Prior to the beginning of the virtual meeting 122, the seating determination manager 138 may obtain an image of the first meeting area. For example, the camera 114 may capture the image of the first meeting area responsive to the media system 110 starting up and may provide the image to the seating determination manager 138. In some implementations, an image of the first meeting area includes an image of the first meeting area obtained during the virtual meeting 122.

In some implementations, the first data includes audio data associated with the first meeting area. The audio data associated with the first meeting area may include audio data obtained by the media system 110 during a previous virtual meeting. The audio data may include speech by one or more in-person participants of the previous virtual meeting. The audio data may include data indicating volume. The audio data may indicate a direction of the audio (e.g., where a microphone 116 of the media system 110 can pick up audio from multiple directions). The audio data may include data indicating which microphone 116 of the media system 110 received the audio (e.g., where the media system 110 includes multiple microphones 116). As discussed further below, the seating determination manager 138 may use audio data to determine an audio quality of a location in the meeting area.

In some implementations, the first data may include data captured by the media system 110 during a preparation phase prior to the beginning of the virtual meeting 122. The preparation phase may include a presentation of a UI 113A of the application 105A that allows the participant to prepare to enter the virtual meeting 122. While in the preparation phase, the video stream processor 134 may not stream video or audio from the client device 102 to one or more other client devices 104B-N or the application 105A may not stream video or audio to the virtual meeting platform 120 or to one or more other client devices 104B-N. The preparation phase can allow a participant to adjust microphone 116 or speaker 118 levels, adjust a camera 114, or perform other virtual meeting preparation tasks. The preparation phase may allow the media system 110 to capture an image of the first meeting area or audio data associated with the first meeting area to be used during the operations of the method 400. In one or more implementations, the first data may include data captured by the media system 110 during the virtual meeting 122.

At block 420, processing logic identifies one or more locations within the first meeting area for the one or more in-person participants and, for each location of the one or more locations for the one or more in-person participants, a location value corresponding to the respective location. A location, within the first meeting area, for the one or more in-person participants may include a location of the first meeting area where an in-person participant can sit, stand, or otherwise be located during the virtual meeting 122. A location value may include a value used to determine whether the corresponding location of the first meeting area is suitable/recommended for seating or other occupation by an in-person participant during the virtual meeting 122.

In one implementation, the seating determination manager 138 uses a first AI model 232A-M and uses the first data as input to the first AI model 232A-M to identify the one or more locations for the one or more in-person participants and determine the one or more location values that correspond to the one or more locations. As discussed above, the first AI model 232A-M may include an AI model trained on one or more images of meeting areas and audio data to identify locations and corresponding location values for a meeting area.

In some implementations, the first AI model 232A-M includes a generative AI model. Identifying, using the first AI model 232A-M, the locations for the in-person participants and the corresponding location values may include providing a generative AI prompt to the generative AI model. The generative AI prompt may include at least a portion of the first data and a command to determine a quality (e.g., a visual quality, an audio quality, or the like) of a location of the first meeting area based on the portion of the first data. As an example, the first data may include an image of the first meeting area, and the generative AI prompt may include the image of the first meeting area and the command to determine the visual quality of one or more locations of the first meeting area may include, "Identify locations in the included image that would be good (suitable) locations for a meeting participant to sit in order to be well-seen and well-heard during a virtual meeting."

As discussed above, a location value may include a value that indicates whether the location of the first meeting area to which the location value corresponds should be provided (e.g., is recommended) for seating or other occupation by an in-person participant during the virtual meeting 122. The location value may include a binary value (e.g., "suitable" or "not suitable"). The location value may include a numerical value (e.g., a value between 0 and 1 where values closer to 0 indicate that the location is less suitable, and values closer to 1 indicate that the location is more suitable).

In some implementations, the location value may fall within a range, and different ranges may indicate a level of suitability. For example, a value within the range 0-0.33 may indicate "not suitable," a value within the range 0.34-0.66 may indicate "somewhat suitable," and a value within the range 0.67-1 may indicate "highly suitable." The number of different ranges and the values that fall within the different ranges can vary from the previous example.

At block 430, processing logic causes a virtual meeting UI to be presented on a client device 102 of a first in-person participant of the one or more in-person participants. The virtual meeting UI may include a first region corresponding to the first meeting area. The first region may include, for each location of the one or more locations for the one or more in-person participants, the visual indication that indicates the location value corresponding to the respective location. The location value can indicate whether the respective location is suitable (e.g., should be recommended) for seating during the virtual meeting 122.

The virtual meeting UI may include the control UI 107 presented on the control display 106 of the client device 102. The control UI 107 may be different than the UI 113A (e.g., the UI that displays one or more regions corresponding to one or more participants of the virtual meeting 122, which may be displayed on the display 112A of the media system 110).

In one implementation, the control UI 107 including a first region corresponding to the first meeting area may include the first region including an image of the first meeting area. The image of the first meeting area may include an image captured by a camera 114 of the media system 110. A visual indication indicating the location value corresponding to a respective location may include an icon displayed on the image of the first area at a place corresponding to the respective location. The icon may include a shape, color, text, or some other visual indicator that can indicate the location value. For example, where the location value is a binary value ("not suitable," "suitable"), the icon may include a red circle for "not suitable" displayed on the location to which the location value corresponds and a green circle for a "suitable" displayed on the location to which the location value corresponds. In another example, where the location value can fall into a range corresponding to "not suitable," "somewhat suitable," or "highly suitable," the icon may include a red circle for "not suitable," a yellow circle for "somewhat suitable," and a green circle for "highly suitable."

In one implementation, the control UI 107 including a first region corresponding to the first meeting area may include the first region including an image of the first meeting area. A visual indication indicating the location value corresponding to a respective location may include a heatmap disposed on the image of the first meeting area. The heatmap may include a partially transparent layer disposed on the image of the first meeting area, and different colors of the heatmap can indicate different location values. As an example, where a location value includes a value between 0 and 1 (where values closer to 0 indicate that the location is less suitable, and values closer to 1 indicate that the location is more suitable), the heatmap may display the color red over locations with a location value closer to 0, the color yellow over locations with a location value closer to 0.5, and green over locations with a location value closer to 1. Different shades of red, yellow, and green can be displayed to indicate the location value.

In some implementations, the first region may include a video of the first meeting area. The video of the first meeting area may include a video of the first meeting area captured in real time (e.g., a live video stream of the first meeting area).

In some implementations, the seating determination manager 138 may periodically perform the method 400 during the virtual meeting 122. The first meeting area may change over time, including during a virtual meeting 122. For example, lighting conditions in the first meeting area may change (e.g., because the first meeting area has windows, and the sun's change in position may change the lighting conditions). Because of the change in conditions of the first meeting area over time, the seating determination manager 138 may periodically perform the method 400 and update the one or more location values. In some implementations, the seating determination manager 138 may continuously perform the method 400, or the seating determination manager 138 may perform the method 400 at a predetermined interval (e.g., every 10 second, 20 second, 30 second, minute, 5 minutes, 10 minutes, 15 minutes, 20 minutes, 30 minutes, or some other time interval).

Figure 5:
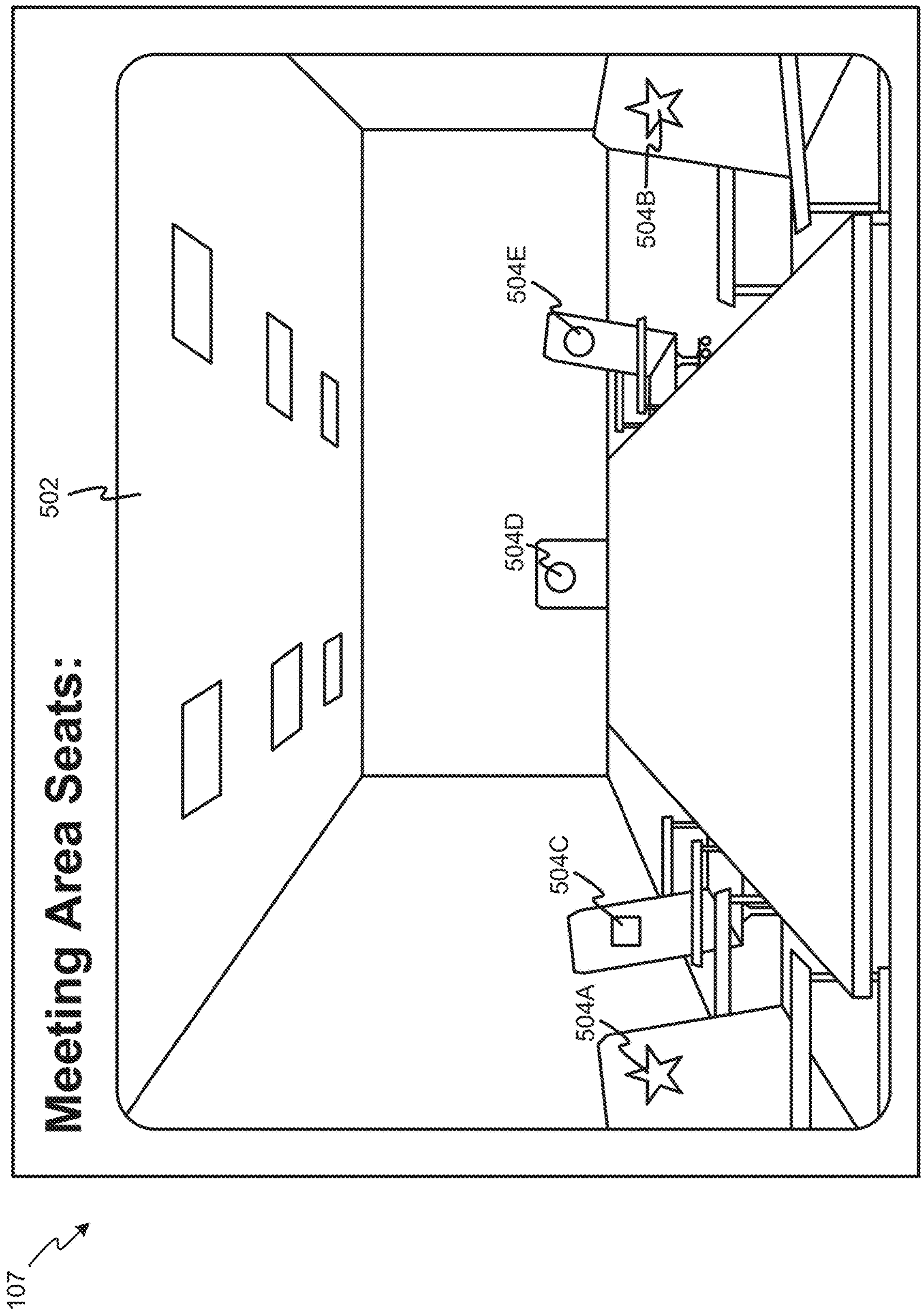
FIG. 5 depicts a user interface (UI) for using AI to provide seating arrangements for a meeting area for a virtual meeting, in accordance with some implementations of the present disclosure.

FIG. 5 depicts an example UI for using AI to provide seating arrangements for a meeting area for a virtual meeting 122, in accordance with some implementations of the present disclosure. The UI may include the control UI 107 presented on the control display 106 of the client device 102 that can be associated with the first meeting area. As seen in FIG. 5, the control UI 107 may include a first region 502 that includes an image of the first meeting area. As can be seen, the first meeting area may include a conference room with a table and multiple chairs disposed around the table.

The first region 502 may include one or more icons 504A-E disposed on different portions of the first region 502. The icons 504A-E may be disposed on locations identified by the AI model in block 420 of the method 400. The icons 504A-E may visually indicate a corresponding location value for each of the identified locations of the first meeting area. For example, as seen in FIG. 5, the icons 504A-B may include stars indicating that the locations of the first meeting area to which the icons 504A-B correspond are highly suitable for seating. The icon 504C may include a square indicating that the location to which the icon 504C corresponds is somewhat suitable. The icons 504D-E may include a circle indicating that the location to which the icons 504D-E correspond is not suitable. An in-person participant of the virtual meeting 122 can approach the control display 106 that displays the control UI 107; view the first region 502 to determine, using the icons 504A-E, which location in the first meeting area offers a suitable seat; and go to the determined location and sit in the suitable seat.

In one implementation, the control UI 107 includes a toolbar (not shown in FIG. 5) that may include one or more UI elements (e.g., buttons) that the in-person participants can interact with to control virtual meeting functionality. Such UI element can include UI elements used to connect to the virtual meeting 122, exit the virtual meeting 122, mute or unmute a microphone 116, mute or unmute a camera 114, adjust a volume of the speakers 118, present a document in a UI 113A-N of the virtual meeting 122, display a list of participants in the virtual meeting 122 on the UI 113A, or perform other virtual meeting 122 functionality.

In one or more implementations, the seating determination manager 138 may detect that an in-person participant occupies a location identified by the AI model 232A-M of the block 420 of the method 400. The seating determination manager 138 may use an AI model 232A-M to detect that a location is occupied. The AI model 232A-M may be the same or may be a different AI model 232A-M than the AI model 232A-M discussed above in regard to block 420 of the method 400. The seating determination manager 138 may input an image of the first meeting area into the AI model 232A-M, and the AI model 232A-M may generate an output that indicates which locations are occupied by in-person participants. The seating determination manager 138 may cause the first region 502 to not display visual indications that correspond to locations of the first meeting area that are occupied by in-person participants.

The seating determination manager 138 may continuously detect whether locations of the first meeting area are occupied. Responsive to a location of the first meeting area no longer being occupied, the seating determination manager 138 may use the AI model 232A-M to determine a location value for such locations and cause corresponding visual indications to be displayed in the first region 502.

In some implementations, during the virtual meeting 122, the seating determination manager 138 may detect that an in-person participant has entered the first meeting area. The in-person participant may include a newly arrived participant that has not yet found a seat in the first meeting area. The in-person participant may include a participant that arrives at the first meeting area after one or more other in-person participants that are already seated.

The seating determination manager 138 may use an image or video of the first meeting area captured by the camera(s) 114 of the media system as input to an AI model 232A-M, and the AI model 232A-M may generate an output detecting that the in-person participant has entered the first meeting area. In response to detecting the in-person participant, the seating determination manager 138 may cause the control UI 107 or the UI 113A presented on the display 112A of the media system 110 to present an alert. The alert may include an image of the first meeting area with one or more visual indications indicating to the newly arrived in-person participant one or more suitable seating locations (which may include an image similar to the image of the first meeting area depicted in FIG. 5). The alert may include text instructing the in-person participant to sit in one of the suitable seats depicted in the alert. In some implementations, the seating determination manager 138 may indicate that the in-person participant is to sit in the unoccupied location with the highest corresponding location value.

In one or more implementations, the seating determination manager 138 determines whether an in-person participant has moved to a location that is not suitable for seating. This may occur because the participant has shifted in their chair, leaned in a certain direction, or performed some other action that has moved the participant to a location that is not suitable for seating. In response, the seating determination manager 138 may cause a UI to display an alert to the participant so the participant can return to the suitable location.

The seating determination manager 138 can determine, using an AI model 232A-M and using second data as input to the AI model 232A-M, a location of a participant in the first meeting area. The AI model 232A-M may be the same or may be a different AI model 232A-M than the AI model 232A-M discussed above in regard to block 420 of the method 400. The second data may include a video stream depicting at least a portion of the first meeting area. The second data may include an image of at least a portion of the first meeting area. The second data may include audio data associated with the first meeting area. The AI model 232A-M may include an AI model trained to determine a location of an in-person participant in a meeting area.

Responsive to obtaining the location of the participant from the AI model 232A-M, the seating determination manager 138 can determine the location value corresponding to the location of the participant. As discussed above in regard to block 420, an AI model 232A-M can determine one or more location values corresponding to one or more locations in the first meeting area. The seating determination manager 138 can identify the location value corresponding to the location of the participant. Responsive to the location value being below a threshold value, the seating determination manager 138 can cause a virtual meeting UI to display an alert. The alert can notify the participant that the participant is not located in a suitable location in the first meeting area and should move to a suitable location.

In one implementation, the threshold value may include a value, and a location value being below that value can indicate that the corresponding location is not suitable for seating. For example, where the location value can be a 0 ("not suitable") or 1 ("suitable"), the threshold value may be 1 (so that if the participant moves to a location with a corresponding location value of 0, the alert is displayed). In another example, where the location value can be a value between 0 and 1, the threshold value may include 0.5, 0.6, 0.7, or some other value.

In some implementations, the virtual meeting UI that presents the alert includes the control UI 107. In one implementation, the virtual meeting UI includes the UI 113A presented on the display 112A.

Figure 6:
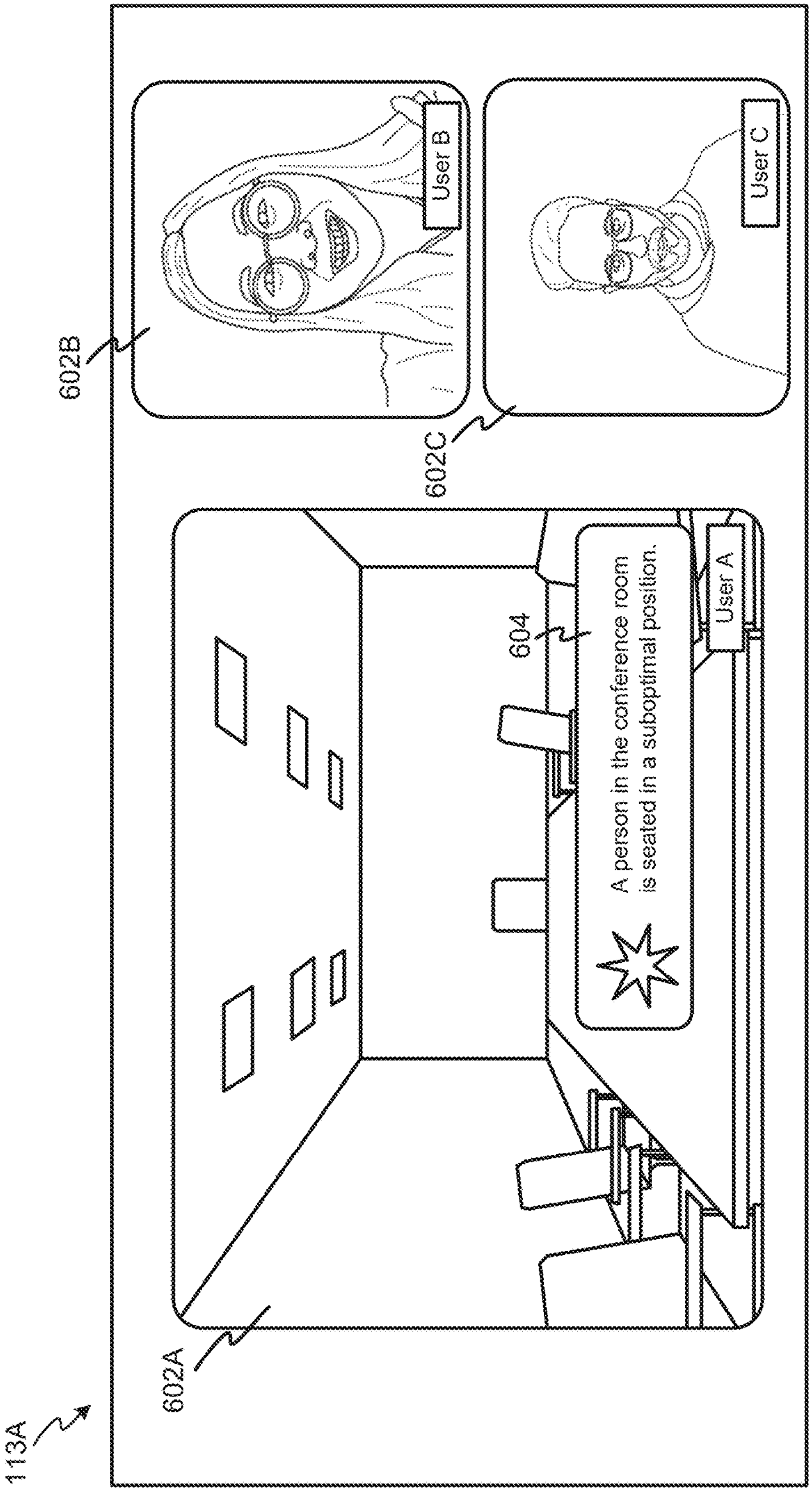
FIG. 6 depicts another UI for using AI to provide seating arrangements for a meeting area for a virtual meeting, in accordance with some implementations of the present disclosure.

FIG. 6 depicts a UI for using AI to provide seating arrangements for a meeting area for a virtual meeting 122, in accordance with some implementations of the present disclosure. The UI may include the UI 113A presented on the display 112A of the media system 110. The UI 113A may include a first region 602A that includes a video stream of the client device 102 (e.g., a video stream obtained from the camera 114 of the media system 110). The video stream may include a video stream of the first meeting area, which may include one or more in-person participants of the virtual meeting 122. The UI 113A may include one or more second regions 602B-C that each include a respective video stream of a client device 104B-C of a virtual participant of the virtual meeting 122.

As discussed above, in one implementation, responsive to the seating determination manager 138 determining that an in-person participant has moved to a location with a corresponding location value below a threshold value, the seating determination manager 138 causes the UI 113A to display an alert 604. The alert 604 can notify the in-person participant that the participant has moved to a location that is not suitable for seating. The alert 604 can include an image of the participant (e.g., to specify which participant of the one or more in-person participants has moved), an instruction on where to move to be in a suitable location, or other information that the participant can use to move to a suitable location.

The alert 604 may be presented on the UI 113A of the display 112A because the in-person participants may mainly look at the display 112A during the virtual meeting 122 (e.g., because the UI 113A displays regions 602B-C that correspond to other participants' video streams). However, the alert 604 is presented on the control UI 107 of the control display 106, in some implementations.

Figure 7:
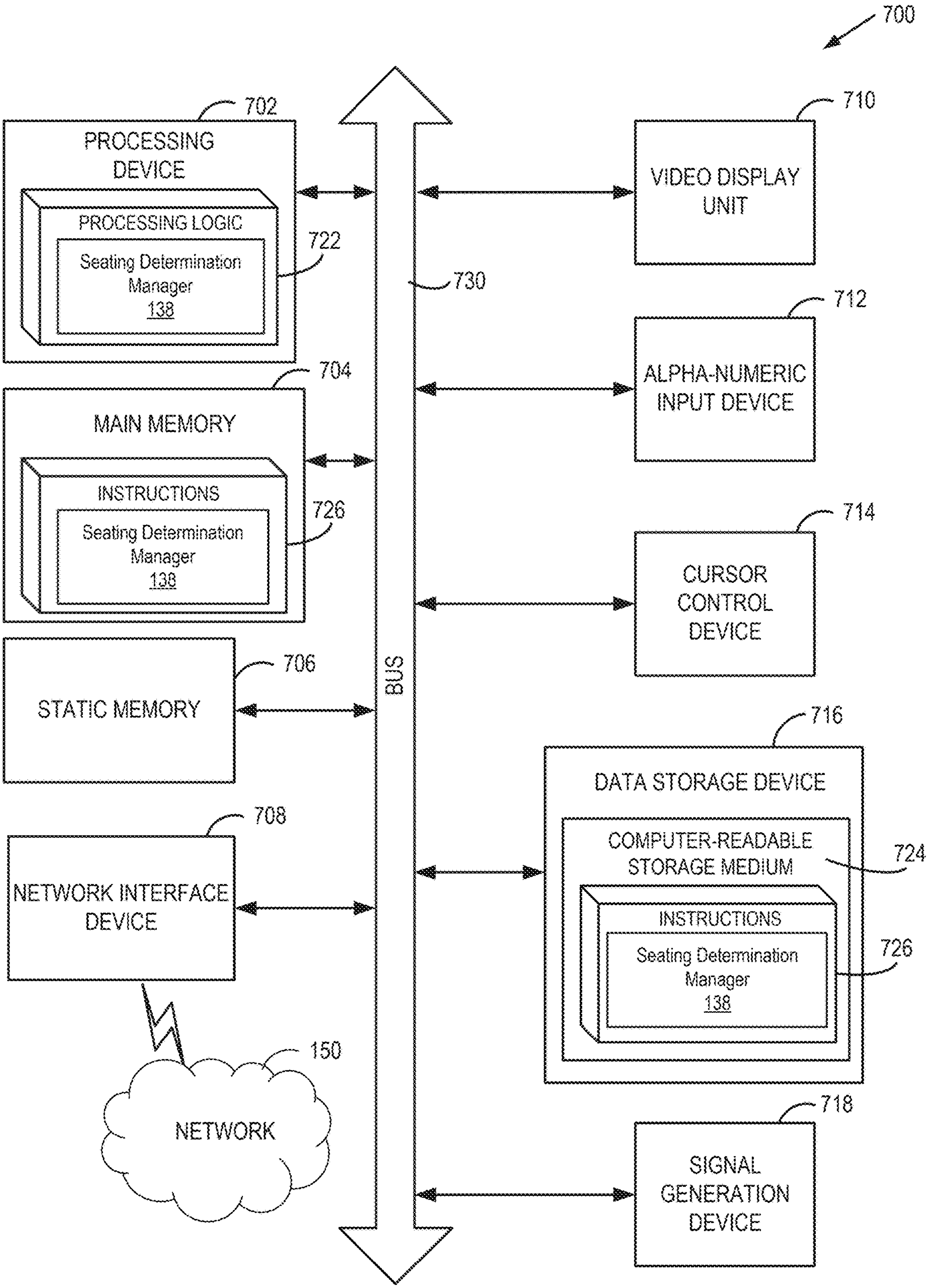
FIG. 7 is a block diagram illustrating an example computer system, in accordance with some implementations of the present disclosure.

FIG. 7 is a block diagram illustrating an example computer system, in accordance with implementations of the present disclosure. The computer system 700 can include a client device 102, 104B-N, the virtual meeting platform 120, or the server 130 in FIG. 1. The machine can operate in the capacity of a server or an endpoint machine, in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 716, which communicate with each other via a bus 730.

The processing device 702 represents one or more general-purpose processing devices such as a microprocessor, central processing unit, or the like. More particularly, the processing device 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute the processing logic 722 for performing the operations discussed herein (e.g., the operations of the seating determination manager 138).

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 718 (e.g., a speaker).

The data storage device 716 can include a non-transitory machine-readable storage medium 724 (sometimes referred to as a "computer-readable storage medium") on which is stored one or more sets of instructions 726 (e.g., the instructions to carry out one or more operations of the seating determination manager 138) embodying any one or more of the methodologies or functions described herein. The instructions can also reside, completely or at least partially, within the main memory 704 and/or within the processing device 702 during execution thereof by the computer system 700, the main memory 704 and the processing device 702 also constituting machine-readable storage media. The instructions can further be transmitted or received over the network 150 via the network interface device 708.

In one implementation, the instructions 726 include instructions for determining visual items for presentation in a user interface of a virtual meeting. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method, comprising:

obtaining first data associated with a first meeting area for a virtual meeting having one or more in-person participants and one or more virtual participants;

identifying, using a first artificial intelligence (AI) model and using the first data as input:

one or more locations within the first meeting area for the one or more in-person participants, and for each location of the one or more locations for the one or more in-person participants, a location value corresponding to a respective location; and causing a virtual meeting user interface (UI) to be presented on a user device of a first in-person participant of the one or more in-person participants, the virtual meeting UI comprising a first region corresponding to the first meeting area, wherein the first region comprises, for each location of the one or more locations for the one or more in-person participants, a visual indication indicating the location value corresponding to the respective location, and wherein the location value indicates whether the respective location is to be recommended for seating during the virtual meeting in view of a capability of a camera or a microphone associated with the first meeting area to capture video or audio of the first in-person participant at the respective location.

2. The method of claim 1, wherein the first data comprises an image of the first meeting area.

3. The method of claim 2, wherein the image of the first meeting area comprises at least one of:

an image of the first meeting area obtained before the virtual meeting; or an image of the first meeting area obtained during the virtual meeting.

4. The method of claim 1, wherein the first data comprises audio data associated with the first meeting area.

5. The method of claim 1, wherein:

the first AI model comprises a generative AI model; and identifying, using the first AI model and using the first data as input, the location value corresponding to the respective location comprises providing a generative AI prompt to the generative AI model, wherein the generative AI prompt includes at least a portion of the first data and a command to determine a visual quality of the respective location based on the at least a portion of the first data.

6. The method of claim 1, wherein:

the first region comprises an image of the first meeting area; and the visual indication indicating the location value corresponding to the respective location comprises an icon disposed on the image of the first meeting area at a place corresponding to the respective location.

7. The method of claim 1, wherein:

the first region comprises an image of the first meeting area; and the visual indications indicating the one or more location values corresponding to the one or more locations comprise a heatmap disposed on the image of the first meeting area.

8. A system, comprising:

a memory, and a processing device, coupled to the memory, configured to perform operations comprising:

obtaining first data associated with a first meeting area for a virtual meeting having one or more in-person participants and one or more virtual participants, identifying, using a first artificial intelligence (AI) model and using the first data as input:

one or more locations within the first meeting area for the one or more in-person participants, and for each location of the one or more locations for the one or more in-person participants, a location value corresponding to a respective location, and causing a first virtual meeting user interface (UI) to be presented on a user device of a first in-person participant of the one or more in-person participants, the first virtual meeting UI comprising a first region corresponding to the first meeting area, wherein the first region comprises, for each location of the one or more locations for the one or more in-person participants, a visual indication indicating the location value corresponding to the respective location, and wherein the location value indicates whether the respective location is to be recommended for seating during the virtual meeting in view of a capability of a camera or a microphone associated with the first meeting area to capture video or audio of the first in-person participant at the respective location.

9. The system of claim 8, wherein the operations further comprise:

determining, using a second AI model and using second data as input, a location of a participant in the first meeting area;

determining the location value corresponding to the location of the participant; and responsive to the location value being below a threshold value, causing an alert to be displayed on a second virtual meeting UI.

10. The system of claim 9, wherein the second data comprises at least one of:

a video stream depicting the first meeting area; or audio data associated with the first meeting area.

11. The system of claim 8, wherein the first data comprises at least one of:

an image of the first meeting area obtained before the virtual meeting;

an image of the first meeting area obtained during the virtual meeting; or audio data associated with the first meeting area.

12. The system of claim 8, wherein:

the first AI model comprises a generative AI model; and identifying, using the first AI model and using the first data as input, the location value corresponding to the respective location comprises providing a generative AI prompt to the generative AI model, wherein the generative AI prompt includes at least a portion of the first data and a command to determine a visual quality of the respective location based on the at least a portion of the first data.

13. The system of claim 8, wherein:
the first region comprises an image of the first meeting area; and
the visual indication indicating the location value corresponding to the respective location comprises an icon disposed on the image of the first meeting area at a place corresponding to the respective location.

14. The system of claim 8, wherein:
the first region comprises an image of the first meeting area; and
the visual indications indicating the one or more location values corresponding to the one or more locations comprise a heatmap disposed on the image of the first meeting area.

15. A non-transitory computer-readable storage medium comprising instructions that, when executed by a processing device, cause the processing device to perform operations comprising:
obtaining first data associated with a first meeting area for a virtual meeting having one or more in-person participants and one or more virtual participants;
identifying, using a first artificial intelligence (AI) model and using the first data as input:
one or more locations within the first meeting area for the one or more in-person participants, and
for each location of the one or more locations for the one or more in-person participants, a location value corresponding to a respective location; and
causing a virtual meeting user interface (UI) to be presented on a user device of a first in-person participant of the one or more in-person participants, the virtual meeting UI comprising a first region corresponding to the first meeting area, wherein the first region comprises, for each location of the one or more locations for the one or more in-person participants, a visual indication indicating the location value corresponding to the respective location, and wherein the location value indicates whether the respective location is to be recommended for seating during the virtual meeting in view of a capability of a camera or a microphone associated with the first meeting area to capture video or audio of the first in-person participant at the respective location.

16. The computer-readable storage medium of claim 15, wherein the first data comprises an image of the first meeting area.

17. The computer-readable storage medium of claim 16, wherein the image of the first meeting area comprises at least one of:
an image of the first meeting area obtained before the virtual meeting; or
an image of the first meeting area obtained during the virtual meeting.

18. The computer-readable storage medium of claim 15, wherein the first data comprises audio data associated with the first meeting area.

19. The computer-readable storage medium of claim 15, wherein:
the first AI model comprises a generative AI model; and
identifying, using the first AI model and using the first data as input, the location value corresponding to the respective location comprises providing a generative AI prompt to the generative AI model, wherein the generative AI prompt includes at least a portion of the first data and a command to determine a visual quality of the respective location based on the at least a portion of the first data.

20. The computer-readable storage medium of claim 15, wherein:
the first region comprises an image of the first meeting area; and
the visual indication indicating the location value corresponding to the respective location comprises at least one of:
an icon disposed on the image of the first meeting area at a place corresponding to the respective location; or
a heatmap disposed on the image of the first meeting area.

* * * * *